United States Patent [19]

Sakoda

[11] Patent Number: 5,558,248
[45] Date of Patent: Sep. 24, 1996

[54] HEADED ROD MEMBER ALIGNING AND SUPPLY APPARATUS

[75] Inventor: Kanji Sakoda, Aichi-ken, Japan

[73] Assignee: Emhart Inc., Newark, Del.

[21] Appl. No.: 304,104

[22] Filed: Sep. 9, 1994

[30] Foreign Application Priority Data

Sep. 10, 1993 [JP] Japan ..................................... 5-049338

[51] Int. Cl.⁶ ...................................................... B23Q 7/12
[52] U.S. Cl. ............................................ 221/164; 221/171
[58] Field of Search ...................................... 221/164, 156, 221/173, 171

[56] References Cited

U.S. PATENT DOCUMENTS

| | | | |
|---|---|---|---|
| 2,844,979 | 7/1958 | Schiller et al. | 221/164 |
| 4,732,296 | 3/1988 | Heck et al. | 221/172 |

FOREIGN PATENT DOCUMENTS

| | | |
|---|---|---|
| 0057103 | 8/1982 | European Pat. Off. . |
| 0268462 | 5/1988 | European Pat. Off. . |
| 1041372 | 10/1953 | France ................................. 221/164 |
| 2590817 | 6/1987 | France . |
| 807442 | 1/1959 | United Kingdom . |
| 2179643 | 3/1987 | United Kingdom . |

*Primary Examiner*—Kenneth Noland
*Attorney, Agent, or Firm*—E. D. Murphy

[57] ABSTRACT

An aligning and supplying apparatus 1 comprises a container 2 to store screws, a chute which enters the container 2 and is formed on the top surface thereof with a groove 3 having a smaller width than the diameter of the screw head so as to receive the screw shank, means for relatively moving the container and the chute between a first position where the bottom surface of the container and the top surface of the chute meet and a second position where the top surface of the chute rises to a predetermined height above the bottom surface of the container, and a first air nozzle 14 which is positioned so as to face toward the top surface of the chute and blow off screws fallen without getting into the groove of the chute. The screw shank is thus received into the chute groove when the apparatus is in the first position and the screw 23 which lies on the top surface of the chute is blown off, leaving screws lined in a row in the groove 3 in the chute.

1 Claim, 6 Drawing Sheets

HEADED ROD MEMBER ALIGNING AND SUPPLY APPARATUS

BACKGROUND OF THE INVENTION

The present invention relates to an aligning and supplying apparatus for headed rod members such as screws and the like to be aligned in a uniform and sequential orientation.

A known headed rod member aligning and supplying apparatus is used for automatically feeding screws or the like to an air driver or some other power tool. In such devices a large number of headed rod members such as a random array of screws are put in a bowl-like container which is then vibrated to allow the headed rod members to ascend in a helical track formed therein. An attachment member mounted on the middle of the track aligns the headed rod members in the track by orienting the unstable rod members passing through and removing those which remain unstable.

In the above-described apparatus the function of the attachment member depends on the presence of a skilled technician to align a large quantity of headed rod members into their proper orientation.

OBJECTS AND SUMMARY OF THE INVENTION

The primary and principle purpose of the present invention is to provide a headed rod member aligning and supplying apparatus for aligning a large quantity of headed rod members without relying on the presence of a skilled technician.

Accordingly to one embodiment of the present invention, there is provided a headed rod member aligning and supplying apparatus adapted to align headed rod members such as screws and the like so that their heads are positioned in a uniform orientation one by one characterized in that the headed rod member aligning and supplying apparatus comprises a container to receive a large number of headed rod members; an elongated chute having a portion inserted into the container and a top surface which is formed with a groove of a diameter being smaller than the shank diameter of headed rod member but larger than the head diameter and of a sufficient depth to receive the shank therein; moving means for effecting relative movement between the container and the chute to move both the container and the chute between a first position such that the bottom surface of the container and the top surface of the chute meet and a second position in which top surface of the chute rises to a predetermined height from the bottom surface of the container; and an air nozzle positioned to be directed toward the top surface of the chute to blow off headed rod members not in the groove of the chute; that in the first position the shanks of a plurality of headed rod members are received in the chute groove from the container in which a large number of headed rod members are contained; that the container or the chute is moved by the moving means to take the second position in which the top surface of the chute is raised from the bottom surface of the container; and that in the second position the air nozzle blows off the excess headed rod members on the top surface of the chute to thereby retain only the aligned headed rod members left in the groove of the chute.

The chute may be connected to a feed member which extends to an escapement means which separates and feeds the aligned headed rod members one by one. A second air nozzle also may be provided for directing air onto the top surface of the chute so as to send the headed rod members aligned in the groove to the feed member.

The invention will be better understood and further objects and advantages thereof will become more apparent from the ensuing detailed description of the preferred embodiments taken in conjunction with the drawings.

DETAILED DESCRIPTION OF THE PREFERRED EMBODIMENT

Figure 1:
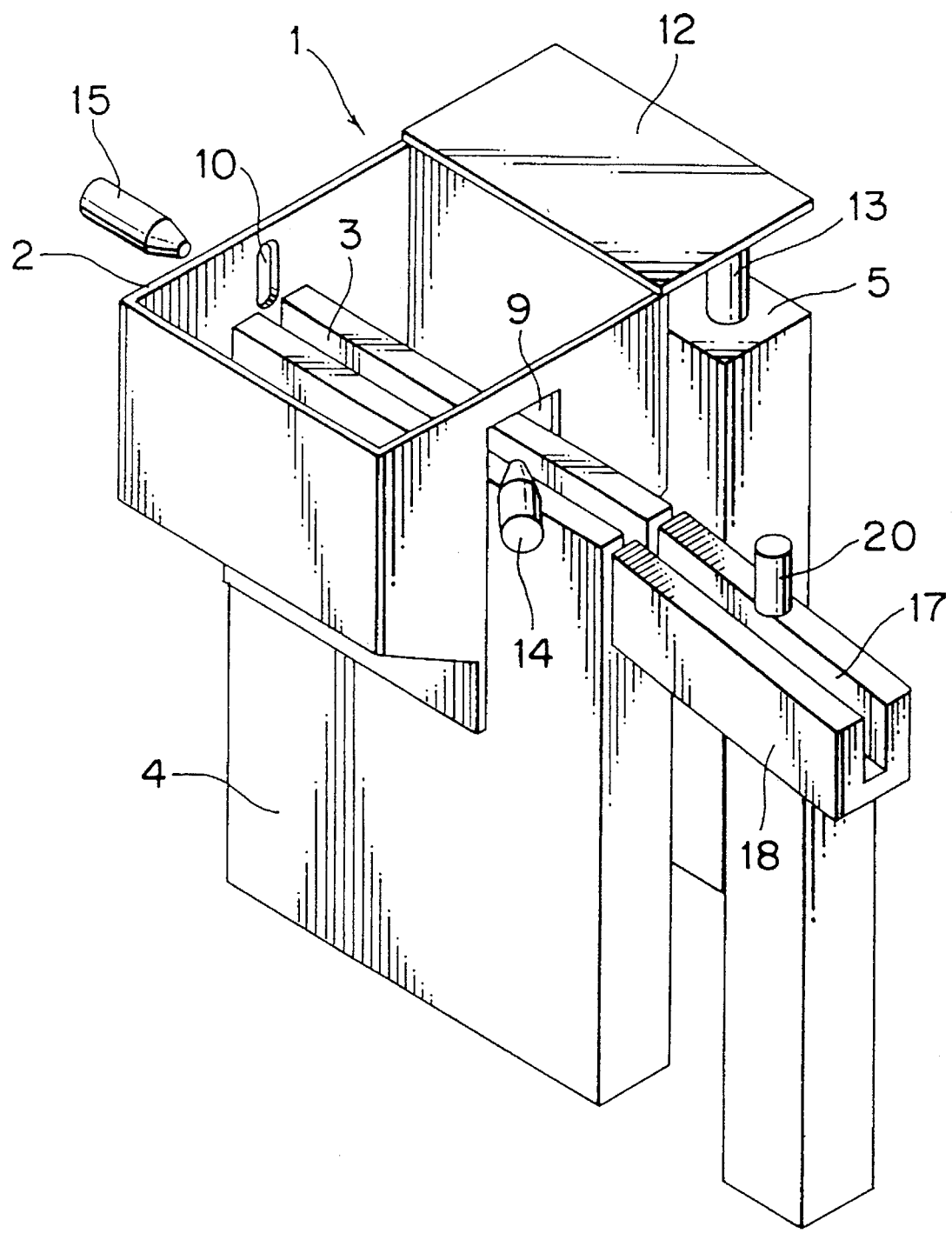
FIG. 1 is a perspective view of a headed rod member aligning and supplying apparatus according to the present invention.

Referring to FIG. 1 there is shown a headed rod member aligning and supplying apparatus 1 according to the present invention. For convenience's sake, headed rod members are represented by screws in the following description but they can be T-studs, nails, blind rivets or the like. The aligning and supplying apparatus 1 for these headed rod members comprises a container 2 for containing a large number of screws randomly scattered, an elongated chute 4 having a portion inserted into the container and a top surface which is formed with a groove 3 of a diameter being larger than a screw shank but smaller than a screw head and of a sufficient depth for receiving the shank therein, and a piston-cylinder device 5 as a moving means for effecting relative movement between the container 2 and the chute 4 to move them with respect to each other between a first position in which the bottom surface of the container and the top surface of the chute meet and a second position in which the top surface of the chute rises to a predetermined height from the bottom surface of the container.

Figure 2:
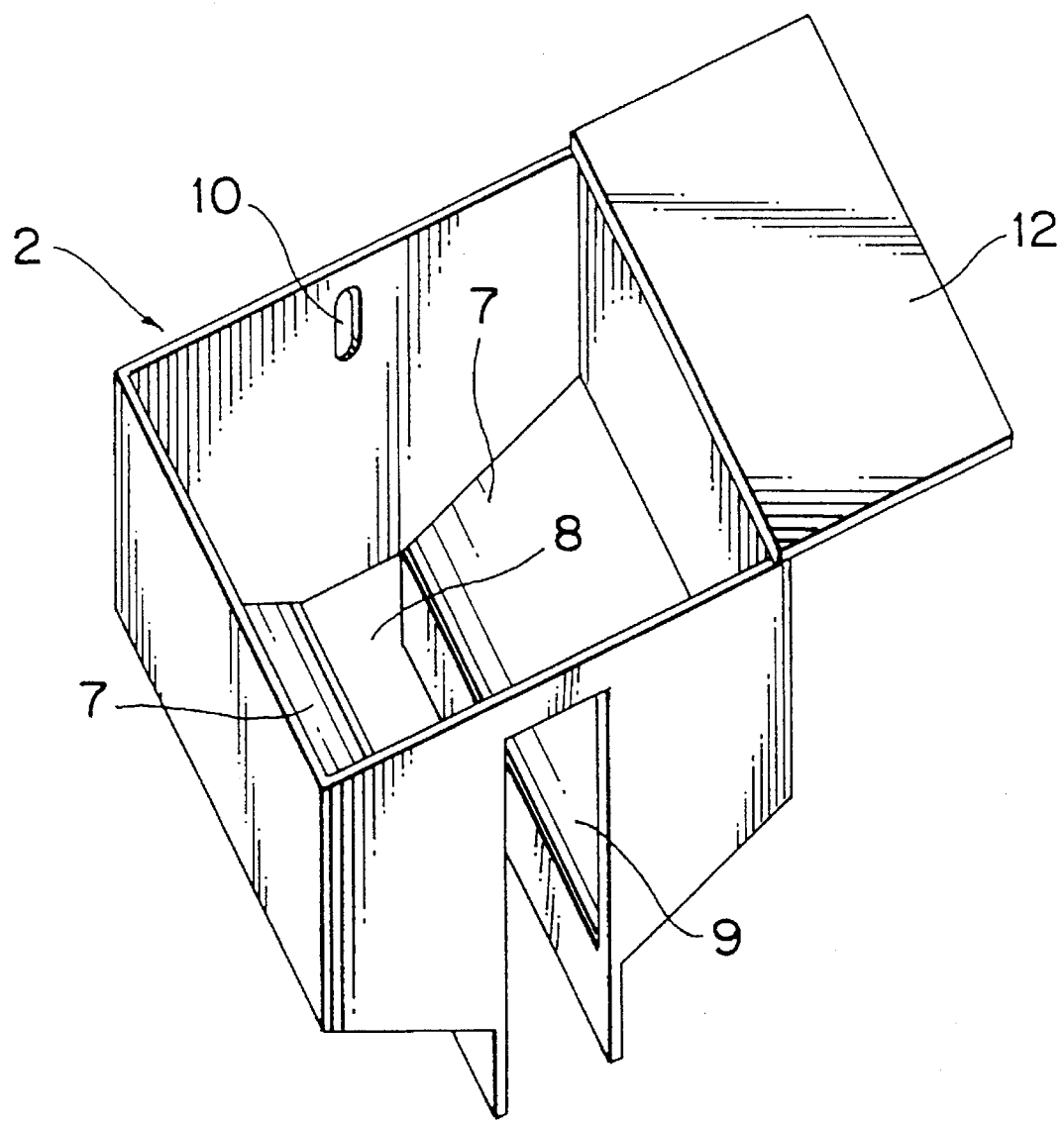
FIG. 2 is a perspective view of a container.

Referring to FIG. 2, the container 2 is formed like a box opening at its top in order to store a large number of screws. The center of a bottom surface 7 is provided with an opening 8 to receive the chute 4. The bottom surface 7 inclines downwardly from side surfaces to the opening 8 so that stored screws can move toward the opening 8 because of gravity. Aligned with the chute 4, which is received in the opening 8 of the bottom surface 7 is a slot 9 that allows an outlet portion of the chute 4 to exit from the container 2. Further, the side opposite to the slot 9 is formed with a slit 10 at a position corresponding to the groove 3 of the chute 4. One of the side edges of the container 2 extends crossways, and an extended portion 12 is connected with a piston rod 13 of the piston-cylinder device 5.

Figure 3A:
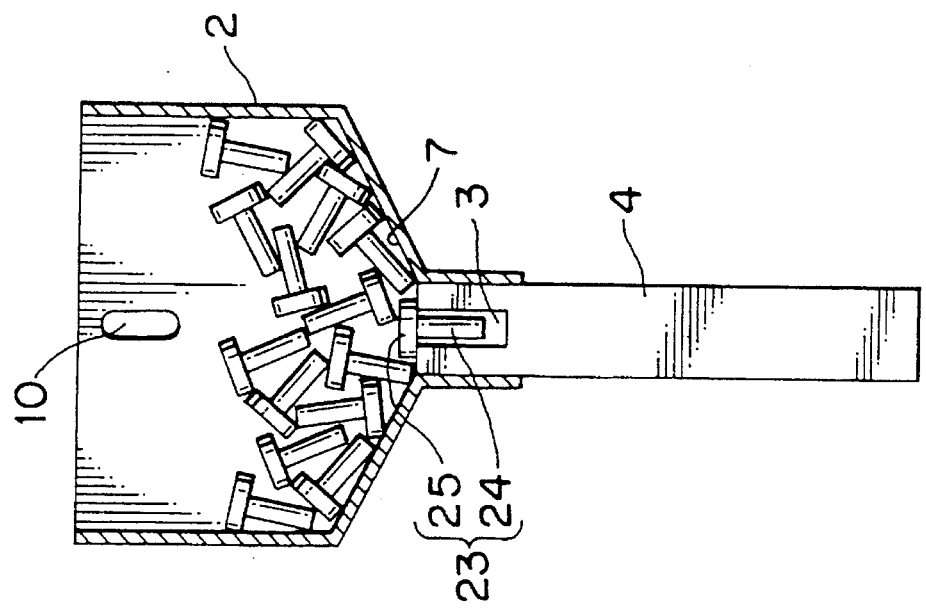
FIGS. 3A and 3B show the container and a chute in the first position and in the second position, respectively.
Figure 3B:
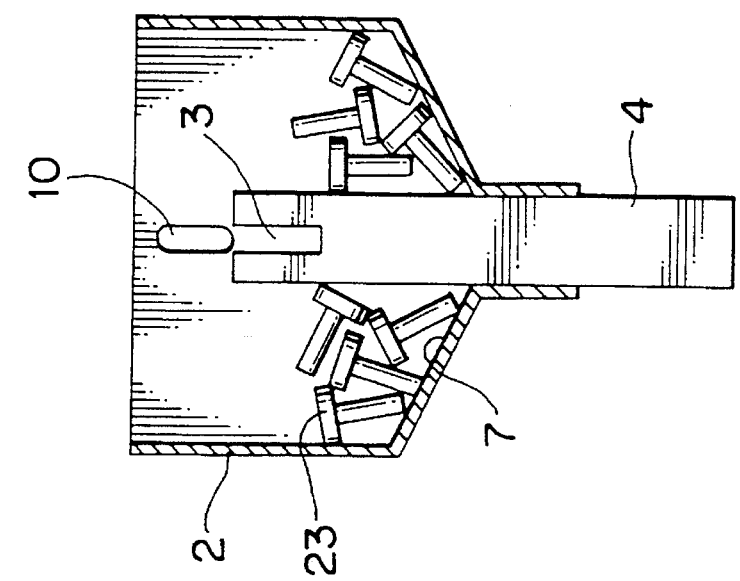

The chute 4 is made into an elongated shape so as to form the elongated groove 3 and is also formed in a plate-configuration so as to be received in the opening 8 of the container 2. The piston-cylinder device 5 moves the container 2 and chute 4 with respect to each other between a first position in which the bottom surface 7 of the container and the groove 3 on the top surface of the chute meet and a second position in which the groove 3 of the chute rises to a predetermined height from the bottom surface 7 of the container. In this embodiment, the chute 4 is fixed and extended portion 12 of the container 2 is connected to the piston rod 13 of the piston-cylinder device 5 so that the container 2 can be moved up and down. Alternatively, the container 2 may be fixed and the chute 4 may be moved. It is also possible to move both the container 2 and chute 4. The first position and the second position referred to above are described with reference to FIG. 3A that shows the second position in which the groove 3 of the chute is raised to a predetermined height from the bottom surface 7 of the container, while FIG. 3B shows the first position in which the bottom surface 7 of the container and the groove 3 on the top surface of the chute meet.

Figure 4:
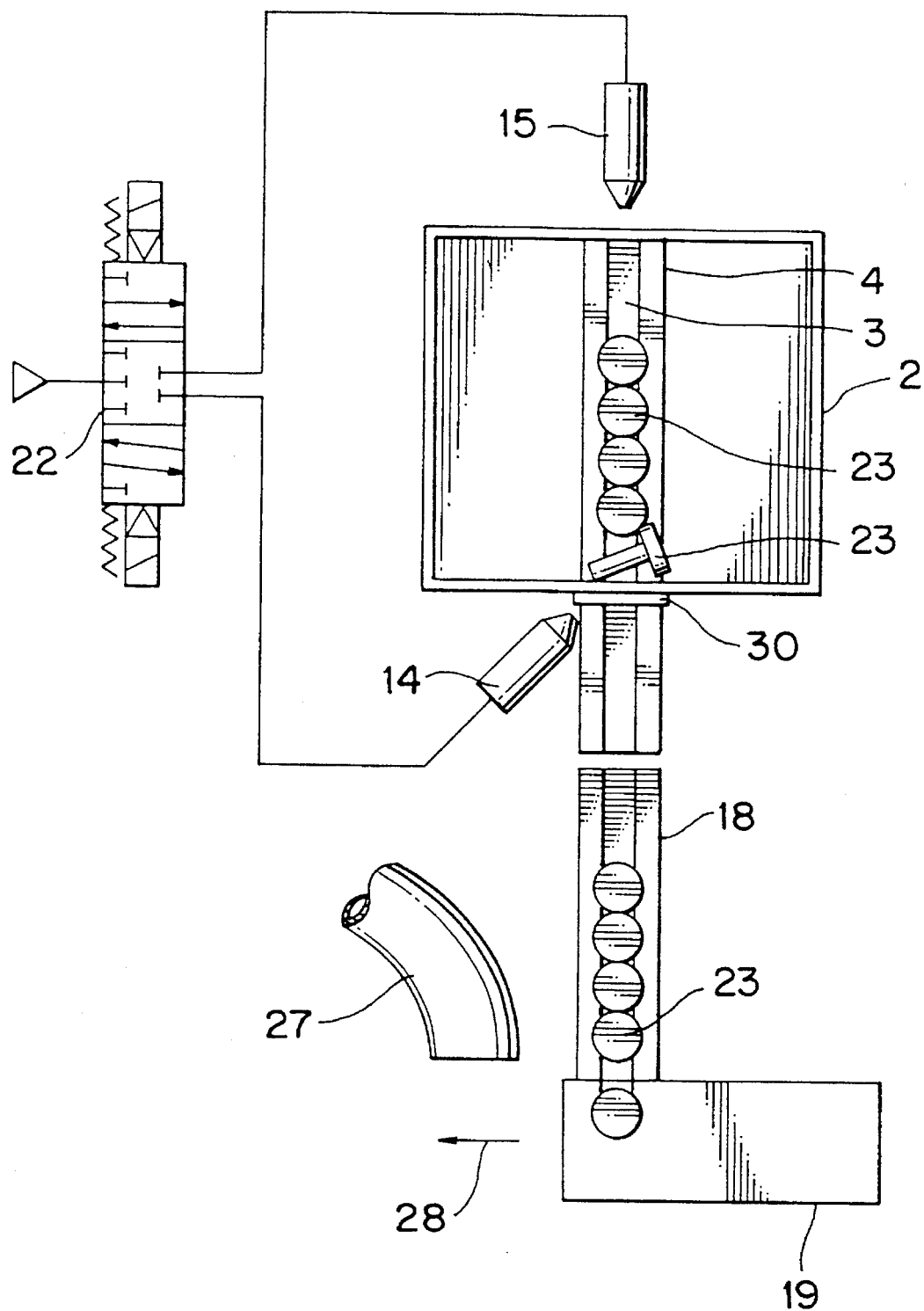
FIG. 4 is a plan view of the aligning and supplying apparatus prior to aligning screws in a row in the chute.
Figure 5:
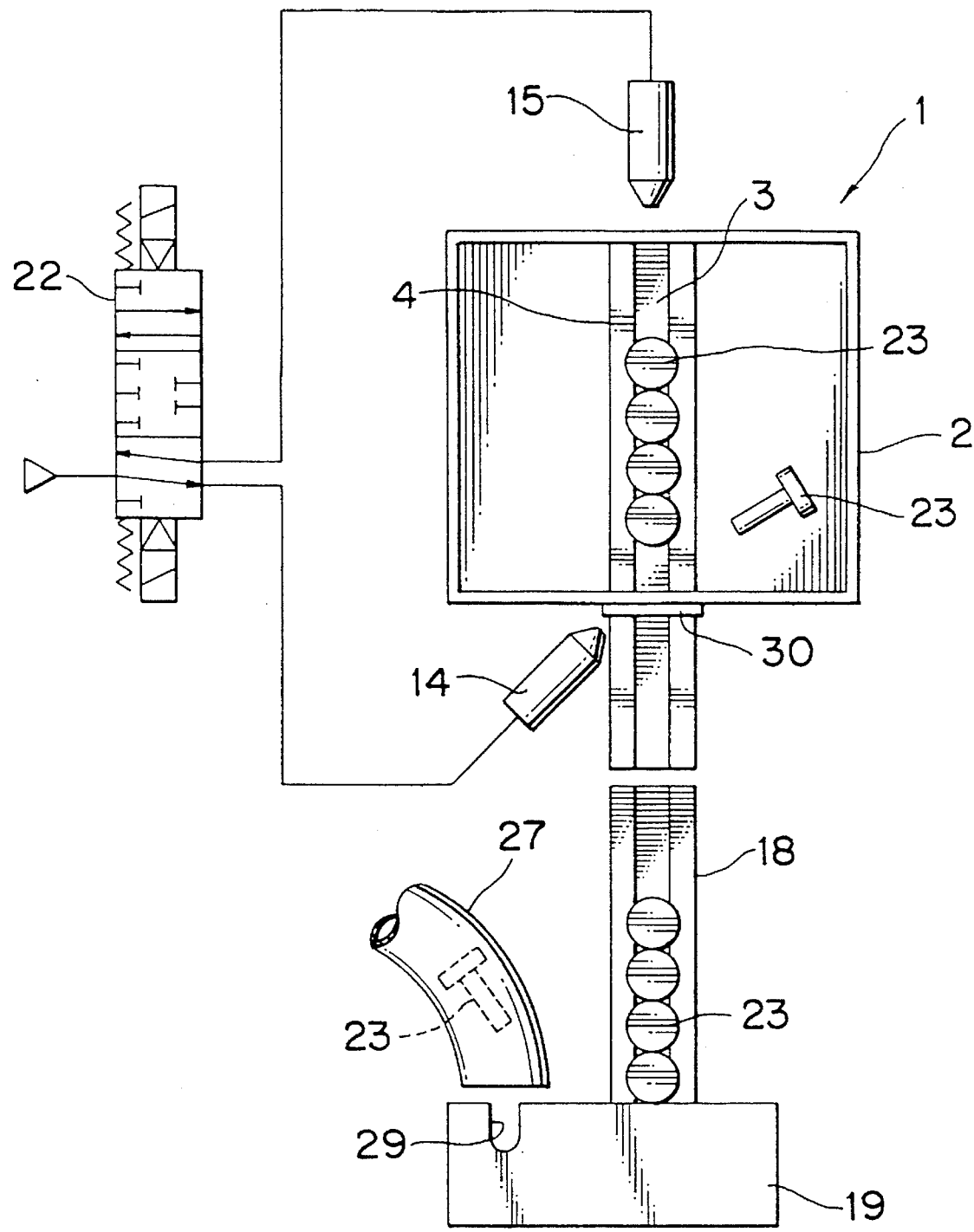
FIG. 5 is a plan view of the aligning and supply apparatus in which a screw lying fallen is blown off from the chute.
Figure 6:
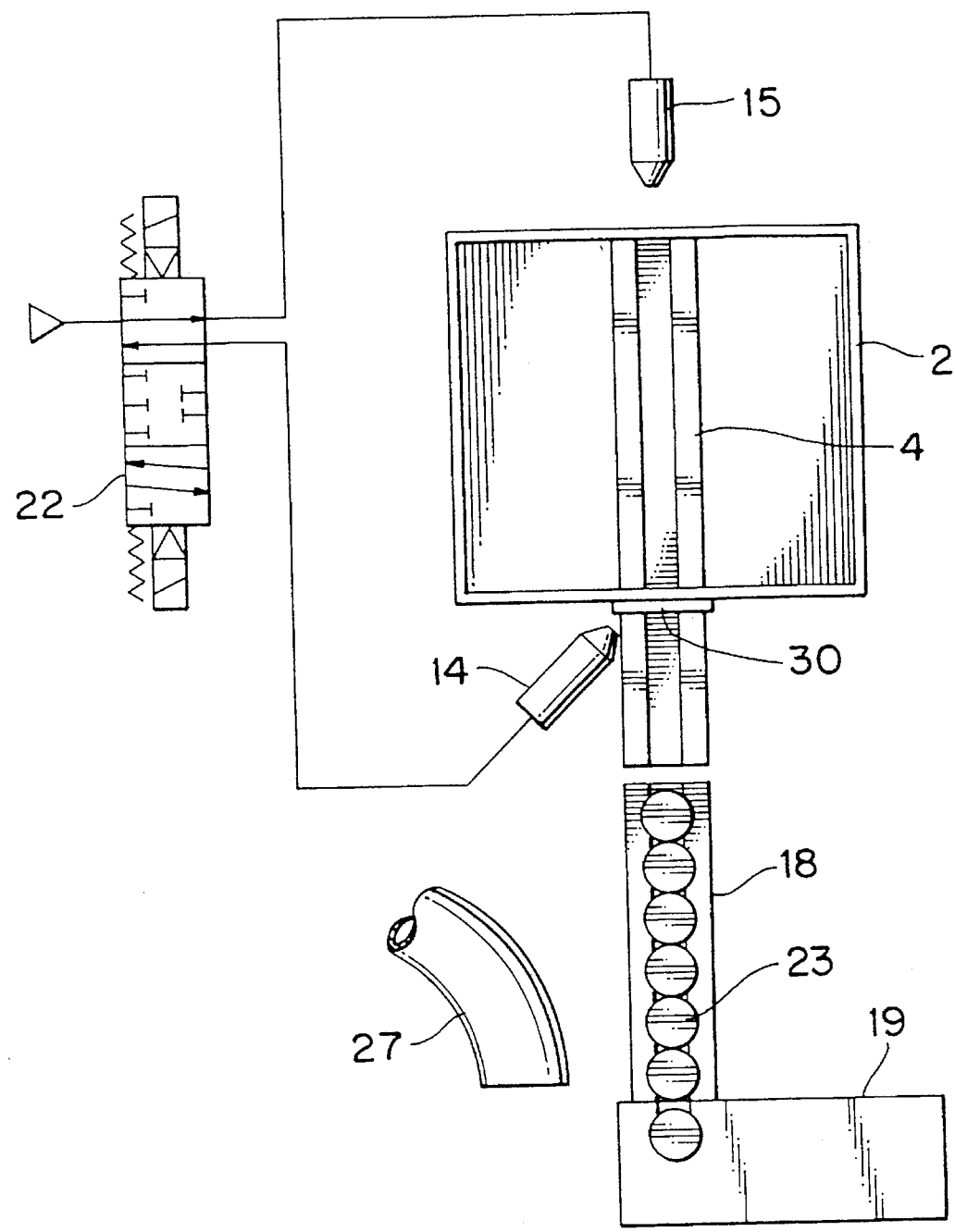
FIG. 6 is a plan view of the aligning and supplying apparatus is which aligned screws have been fed to a feed member.

The aligning and supplying apparatus 1 is equipped with a first air nozzle 14 to blow air to the groove 3 of the chute 4 so as to blow off headed rod members that are not in the groove 3 of the chute 4. In order to send the screws aligned in the chute groove 3 to the outlet portion of the chute 4, a second air nozzle 15 is provided to blow air from the outside of the container 2 via the slit 10 to the chute groove 3. In the outlet portion of the chute 4, an elongated feed member 18 is formed with a groove 17 which is similar to the chute groove 3. As shown in FIGS. 4 through 6, the feed member 18 extends to an escapement device 19 to separate and feed the aligned screws one by one. In the predetermined position of the feed member 18, a sensor 20 is positioned to detect the screws in the groove 17 so that the sensor detects the screws being fed to the escapement device 19. As shown in FIGS. 4 through 6, the first air nozzle 14 and the second air nozzle 15 are controlled to change their direction or to stop by a 3-position directional control valve 22.

How screws are aligned in a manner that their heads are positioned in the same direction by means of the aligning and supply apparatus 1 as stated above is described with reference to FIGS. 3A and 3B, 4, 5 and 6. As shown in FIG. 3A, a large number of screws 23 are randomly stored in the container, that is, in the second position when the chute groove 3 is at a predetermined height above the bottom surface 7 of the container. Then the piston-cylinder device 5 is actuated to raise the container 2 to the first position in which the bottom surface 7 of the container and the groove 3 on the top surface of the chute meet as shown in FIG. 3B. In the first position, the screws 23 move along the slopes of the bottom surface 7 of the container toward the chute groove 3. The shanks 24 of the screws 23 are received in the chute groove 3 and their heads 25 are brought into engagement with the top of the groove so that the screws are suspended by the groove. Thus, the screws 23 are aligned in a row in the groove 3 with their heads being positioned in the same orientation. When the shanks of the screws 23 are positioned in the groove 3, the container 2 is brought down by the piston-cylinder device 5 to the second position. (See FIG. 3A.) As shown in FIG. 4, however, some screws lie fallen on the top surface of the chute because their shanks have failed to enter the groove 3 of the chute 4. As shown in FIG. 5, the directional control valve 22 is actuated in the second position to feed air to the first air nozzle so that the screws lying on the top surface of the chute 4 can be blown off, which allows only the aligned screws to be left in the groove 3.

After a large number of screws are aligned in the chute 4, as described above, the directional control valve 22 is actuated to stop feeding air to the first air nozzle 14 and instead to supply air to the second air nozzle 14 for feeding the aligned screws to the feed member 18. The feeding may be carried out by sloping the chute 4 instead of feeding air as by means of the second air nozzle. The screws transferred to the feed member 18 are detected by the sensor 20 and the feeding of the screws is informed to the escapement device 19. The escapement device 19 receives the screw at the head of the line into a recess as shown in FIG. 4 to move to a feed tube 27 as indicated by the arrow. In the position shown in FIG. 5, the screw is vacuum-sucked from the recess 29 of the escapement device 19 to the feed tube 27 and is directly fed to a power tool such as a pneumatic screw driver. As shown in FIG. 6, the escapement device 19 returns to receive the screw at the head of the aligned screws to send it to the feed tube 27 in accordance with the demand from the power tool. When all the aligned screws in the feed member 18 have been fed, the screw aligning operation is repeated on the chute 4. As shown in FIGS. 4 through 6, the chute 4 may be provided with a gate 30 in a portion just outside of the container 2 for separating the work of aligning screws from the feeding of aligned screws to the feed member.

Thus there has been provided an aligning and supplying apparatus for headed rod members or screw which is equipped with a container and a chute having a groove on the top surface thereof with a portion of the chute being in the container. The container and the chute are moved with respect to each other between a first position in which the bottom surface of the container and the top surface of the chute meet and a second position in which the top surface of the chute rises to a predetermined height above the bottom surface of the container. In the first position, the shanks of a plurality of headed rod members within the container fall into a groove of the chute and in the second position, the excess headed rod members lying on the top surface of the chute are blown off by means of an air nozzle so as to leave only the aligned headed rod members in the groove.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A headed rod member aligning and supply apparatus comprising, a container for receiving a plurality of headed rod members, an elongated chute having a portion thereof inserted into said container, said chute having a top surface formed with a groove having a width smaller than the diameter of the head of said headed rod member but larger than the diameter of the shank of said headed rod member to thereby receive the shank of said headed rod member therein, moving means for effecting relative movement between said container and said chute to thereby move said container and said chute between a first position in which the bottom surface of said container and the top surface of said chute meet and a second position in which the top surface of said chute rises to a predetermined height above the bottom surface of said container a number of said plurality of headed rod members being received in said groove of said chute when said chute and said container are in said first position, and an air nozzle directed towards the top surface of said chute for blowing off therefrom excess headed rod members not positioned in said groove of said chute when said chute and said container are in said second position;

said apparatus further including a feed member connected to said chute, an escapement means which separates and feeds the aligned headed rod members one by one, and a second air nozzle for blowing air onto the top surface of said chute so as to move the headed rod members aligned in a row in said groove to said feed member.

* * * * *